United States Patent [19]

Hess

[11] Patent Number: 5,412,920
[45] Date of Patent: May 9, 1995

[54] ARTICLE FOR CONNECTING LATERALLY SPACED BEAMS

[76] Inventor: Tommy M. Hess, 115 S. Office St., Braidwood, Ill. 60408

[21] Appl. No.: 73,774

[22] Filed: Jun. 8, 1993

[51] Int. Cl.⁶ .............................................. E04B 1/38
[52] U.S. Cl. .......................................... 52/712; 52/94; 52/696; 403/232.1
[58] Field of Search ................. 52/712, 690, 696, 639, 52/643, 702, 94, 749; 403/232.1, 231; 248/300

[56] References Cited

U.S. PATENT DOCUMENTS

| | | | |
|---|---|---|---|
| 2,964,807 | 12/1960 | Kennedy | 52/696 |
| 3,959,945 | 6/1976 | Allen | 52/690 |
| 3,972,169 | 8/1976 | Sheppard, Jr. | 248/300 |
| 4,122,647 | 10/1978 | Kovar | 52/712 |
| 4,442,638 | 4/1984 | Hamilton | 403/232.1 |
| 4,527,375 | 7/1985 | Braginetz | 403/232.1 |
| 4,704,829 | 11/1987 | Baumker, Jr. | 52/696 |
| 5,259,685 | 11/1993 | Gilb | 403/231 |

OTHER PUBLICATIONS

Simpson Strong-Tie Company, *Connectors for Wood Construction*, Catalog C-90H-1 (Jan. 1990).
Simpson Strong-Tie Company, *Product Use Guide*, (1987).
United Steel Products Co., *Kant-Sag Lumber Connectors: Building Decks with Deck Hardware* (1992), pp. 2, 16-20.

*Primary Examiner*—Carl D. Friedman
*Assistant Examiner*—Kien T. Nguyen
*Attorney, Agent, or Firm*—Laff, Whitesel, Conte & Saret, Ltd.

[57] ABSTRACT

An article for connecting beams includes an outside spanning member which extends between the beams, a cross-web member connected to the outside spanning member, and clasping members which hold the beams in place. Beams are connected by placing the article between the beams so that the clasping members are against the sides of the beams. The article is formed by bending sheet material into a three-dimensional configuration which includes the various members of the article discussed above.

11 Claims, 4 Drawing Sheets

U.S. Patent    May 9, 1995    Sheet 1 of 4    5,412,920
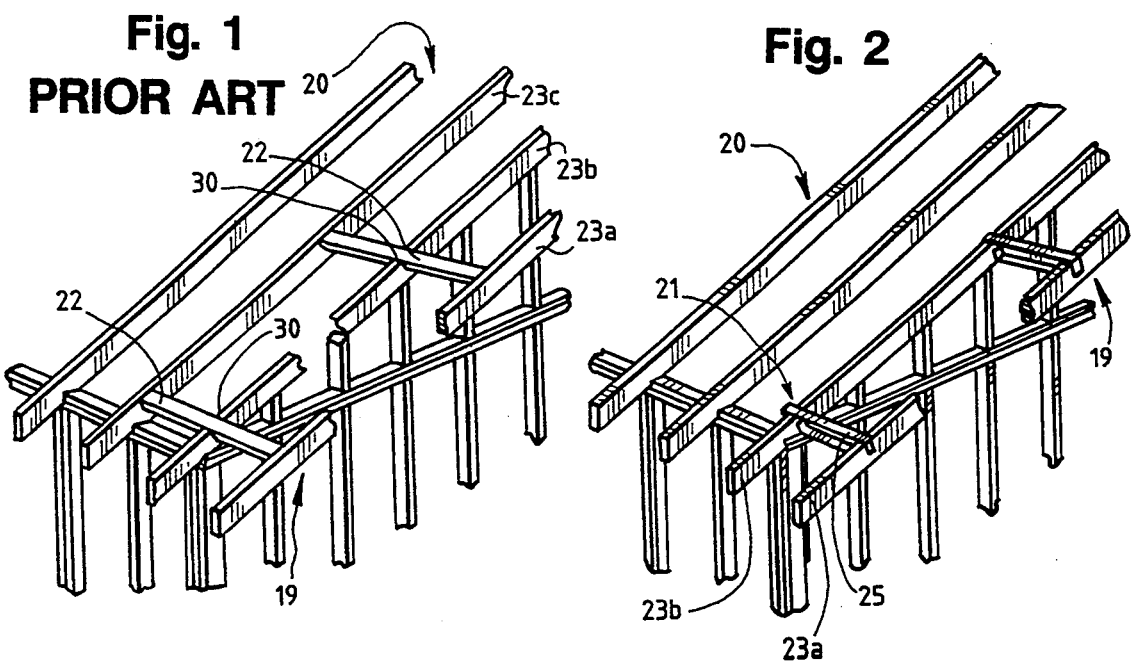
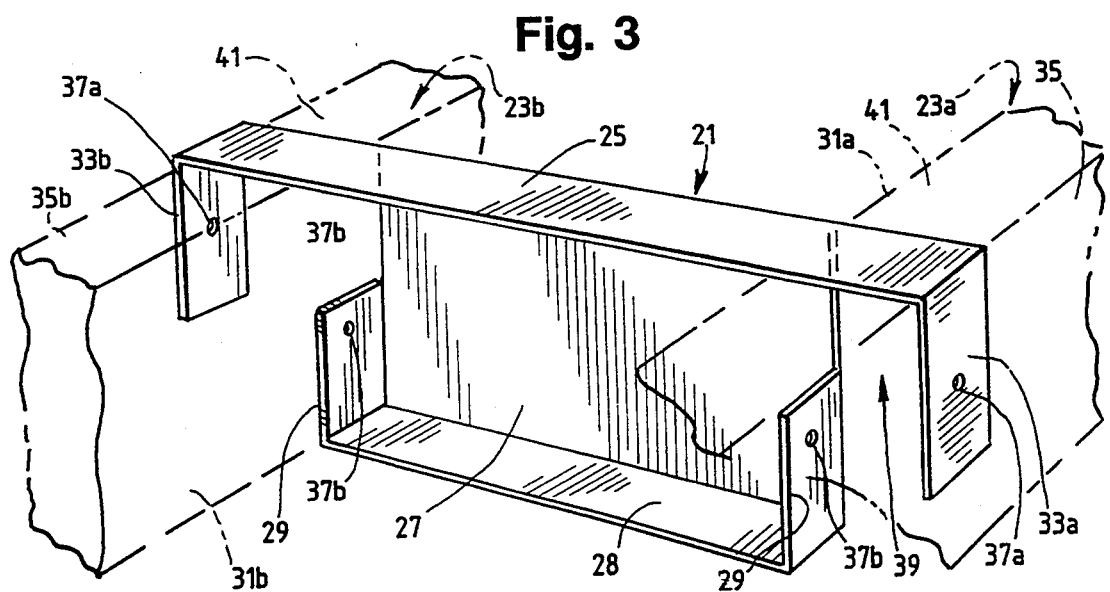

ARTICLE FOR CONNECTING LATERALLY SPACED BEAMS

FIELD

This invention relates to an article and a method for connecting beams and, in particular, an article and method for bridging rafters in gable ends of roofs.

BACKGROUND

Structures which include a series of beams laterally separated from each other, such as roofs, currently make use of wooden "bridging" for interconnecting the beams and supporting the overlying flat portions of roofs. Such wooden bridging or bracing typically consists of multiple pieces which can be assembled only at the construction site and only by cutting into the beams to be connected. For example, in constructing a gable overhang for a roof, sections of the rafter from which the overhang extends (the "stable rafter") must be cut out. Then, wooden 2×4's known as "outriggers" are placed into the sections perpendicular to the rafter. A second wooden piece then needs to be attached underneath the outrigger between the stable and the rafter at the edge of the roof overhang so as to give the connection between the rafters sufficient permanence and to support the overlying flat portions of the gable roof overhang.

Such wooden bridging, the process of creating such bridging, and the process of connecting beams with such bridging is needlessly cumbersome and labor-consuming. Multiple pieces of wood need to be cut and assembled at the site; beams must be measured and cut after they have been installed in the structure. In addition, such wooden bridging is prone to decay over time, especially when exposed to the elements. Thus, the beam interconnections are weakened, and the flat portions of the roof, floor, or other structure supported by the interconnected beams buckle or sag.

For the foregoing reasons, there is a need for an article to interconnect beams which is strong, durable, and easy-to-use, and overcomes shortcomings and failings of the prior art. There is also a need for a method to economically fabricate such articles and interconnect beams without the excessive labor and cumbersome procedures of the prior art.

SUMMARY

Accordingly, it is an object of the present invention to provide a strong, durable article for interconnecting beams which can be easily constructed and even prefabricated away from the construction site. Another object of this invention is to provide a method for readily connecting beams, such as the rafters of a roof, by using far less labor at the construction site; and yet which results in more resilient structures than current methods.

In a preferred embodiment of the invention, an article for interconnecting beams includes a support which extends between the beams and multiple braces connected to the support and fitted against the beams to hold them in place. The article or "bridge" can be constructed from sheet metal or from any other resilient sheet material. The braces of the article are connected to the support in such a way that they form channels which fit around the beams to be connected. When the article is installed between the beams, the upper surface of the article is even with the upper surfaces of the beams connected by the article. Thus, flat portions of a roof, floor, or other structure can be positioned simultaneously against the upper surfaces of the beams and the article. By connecting this article between laterally spaced beams and covering such interconnected beams, a roof or other planar structure can be constructed.

A roof or other structure incorporating the present invention offers many advantages over current structures and construction techniques. For example, the article of this invention connects laterally separated beams without cutting away sections of the beams. As a further advantage, the cumbersome, labor-intensive process of cutting multiple pieces of 2×4's for wooden bridging at the construction site is replaced by the process of positioning a single, prefabricated article the article between the beams, with its braces against the beams. The article has a further advantage of being constructible from sheet material, with little resulting scrap. Moreover, the article will not weaken or allow sagging as does the wood bridging of the prior. The strength and durability of the inventive article also means that the number of such articles needed for a length of beam is less than the number of wooden bridges required for the same length under current methods. Thus there are materials savings as well as labor savings flowing from the present invention.

These and other features of the invention will be more fully understood by reference to the following drawings.

BRIEF DESCRIPTION OF THE DRAWINGS

FIG. 1 is a perspective view of beams interconnected by means of the prior art;

FIG. 2 is a perspective view of the beams of FIG. 1 connected by means of an embodiment of the present invention;

FIG. 3 is an enlarged perspective view of the embodiment of FIG. 2 positioned between two beams;

THE PRIOR ART

Figure 4:
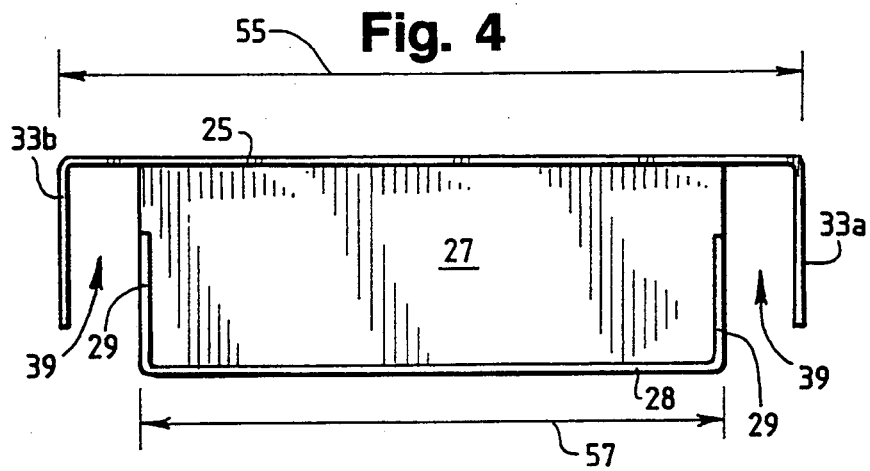
FIG. 4 is a front view of the embodiment of FIGS. 2 and 3.
Figure 6:
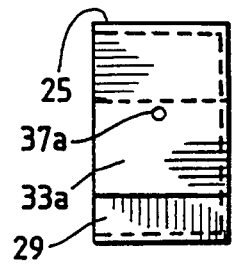
FIG. 6 is a side view of the embodiment of FIGS. 2-5.

Bridging of beams by prior art methods typically consists of multiple wooden pieces which can be assembled only at the construction site and only by cutting into the beams to be connected. For example, in constructing a gable overhang 19 for a roof 20 (FIG. 1) according to the prior art, lengths of 2×4 22, referred to as "outriggers", are fastened perpendicularly to the outermost or "fly" rafter 23a, extend across a second rafter 23b, known as a "stable rafter", and abut a third adjacent rafter 23c. Sections of the stable rafter 23b must be cut out sufficiently at locations 30 to accommodate the width and height of the outriggers 22.

DETAILED DESCRIPTION

Figure 5:
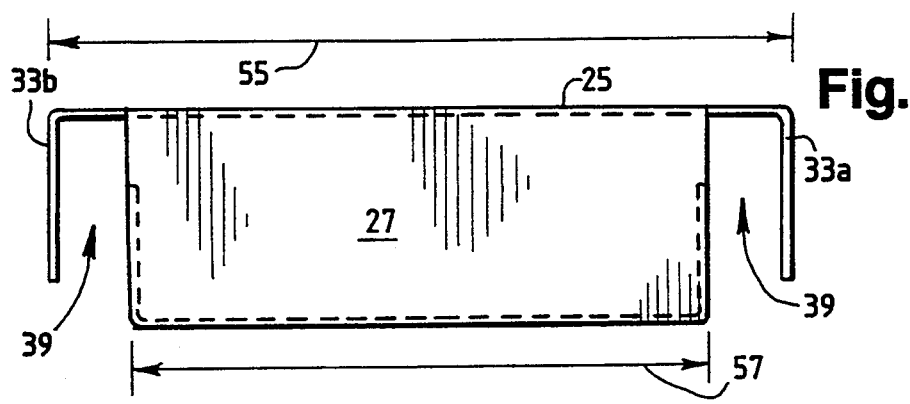
FIG. 5 is a rear view of the embodiment of FIGS. 2-4.

Referring now to the other drawings and more particularly to FIG. 2 thereof, there is shown an embodiment of the present invention for use with a gable overhang 19 of a similar roof 20. An article 21 in accordance with the invention is positioned between rafters 23a and 23b. This article has an outside spanning member 25 which extends between the rafters 23a and 23b; a cross-web member 27 (FIG. 3) which connects perpendicularly to the outside spanning member 25; inside clasping members 29 in contact with inner surfaces 31a and 31b of the rafters 23a and 23b, respectively; and outside clasping members 33a and 33b extending perpendicularly from the outside spanning member 25 and contacting outer surfaces 35a and 35b of the rafters 23a and 23b, respectively. An inside spanning member 28 extends perpendicularly from the cross-web member 27. The cross-web member 27 and the outside clasping members 33 are connected to the outside spanning member 25 so as to define channels 39 (FIGS. 3, 4 and 5) for receiving the beams 23. Holes 37a and b, adapted for receiving fasteners, are located on the inside clasping members 29 and on the outside clasping members 33.

In operation, the article 21 is positioned between the rafters 23 and receives portions of the rafters 23 into the channels 39 (FIG. 3). Upper surfaces 41 of the beams 23 received into the channels 39 are almost coplanar with the upper surface of the outside spanning member 25 (neglecting the thickness of the outside spanning member 25, which is not very great considering that it is manufactured from sheet metal). This allows for flat portions of roofs, floors, or other structures to be positioned substantially flush against both the interconnected rafters 23 and the outside spanning member 25 of the article as shown for the roof 20 of FIG. 2.

Since the cross-web member 27 and inside clasping members 29 abut the inner rafter surfaces 31, they act to resist flexion of the rafters in a lateral, inward direction (i.e., toward each other). Similarly, the outside clasping members 33 which are in contact with the outer beam surfaces 35 resist rafter movement in a lateral outward direction (i.e., away from each other). The article 21 is further fastenable to the beams by inserting fasteners such as bolts or wood screws (not shown) through the holes 37 and into the beams 23.

Although the rafters 23a and 23b and the article 21 are part of a roof structure in this particular embodiment, the article 21 and the illustrated method for connecting rafters therewith can be used in any construction involving laterally or vertically spaced beams.

Figure 7:
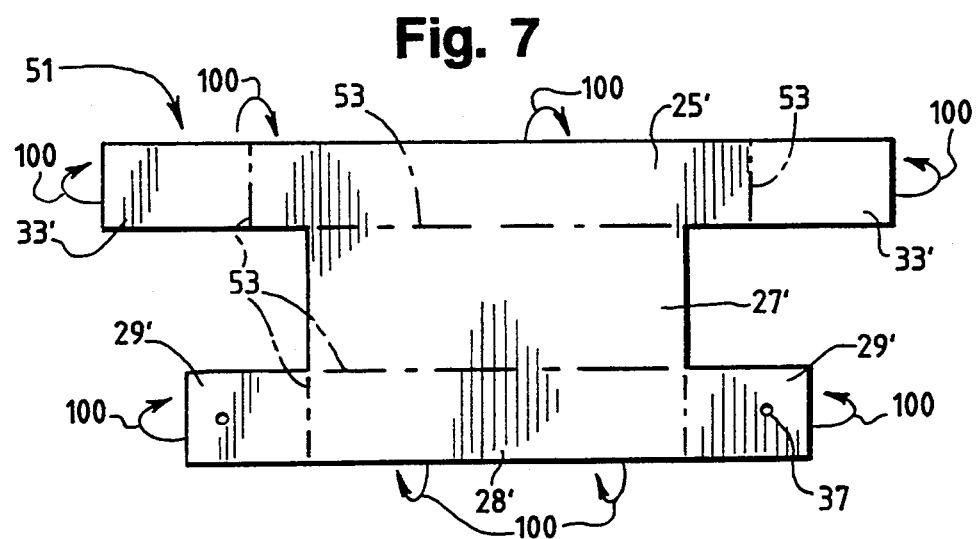
FIG. 7 is a plan view of the embodiment of FIGS. 2-6 shown in an intermediate stage of construction.

The entire article 21 is preferably constructed from a single sheet of metal 51 shown in FIG. 7. Contiguous rectangular areas corresponding to the outside spanning member 25, the cross-web member 27, the inside spanning member 28, the inside clasping members 29, and the outside clasping members 33, are defined in the sheet metal 51 as shown by the primed reference numerals in FIG. 7. The sheet metal 51 is then bent at substantially 90 degree angles as shown by the directional arrows 100 of FIG. 7 along edges 53 of the defined rectangles, thereby forming the three-dimensional article 21 shown in FIGS. 2 through 6.

The article 21 is thus comprised of planar sheet metal preferably of 20 to 18 gauge steel. It will be appreciated by those skilled in the art that alternative sheet material and alternative thicknesses may also be suitable for use in the present invention. The outside spanning member 25 has a length 55 (FIGS. 4 and 5) sufficient to extend between the outer surfaces 35 of the rafters 23 (FIG. 3). Similarly, the cross-web member 27 and the inside spanning member 28 have a length 57 (FIGS. 4 and 5) sufficient to abut the inner surfaces 31 of the rafters 23 (FIG. 3). The inside clasping members 29, as well as the outside clasping members 33, are of dimensions sufficient to resist lateral flexion of the rafters. The holes 37a are located within the planar surfaces of the article such that fasteners inserted through the holes 37 enter the beams 23 at locations which are not aligned with the locations of fasteners inserted into the holes 37b.

Figure 8:
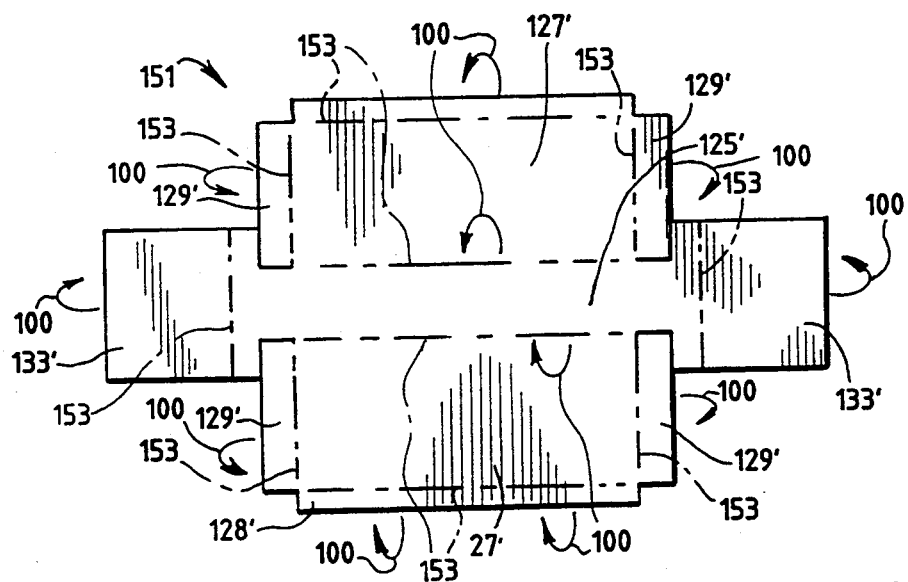
FIG. 8 is a plan view of another embodiment of the present invention shown at an intermediate stage of construction.
Figure 9:
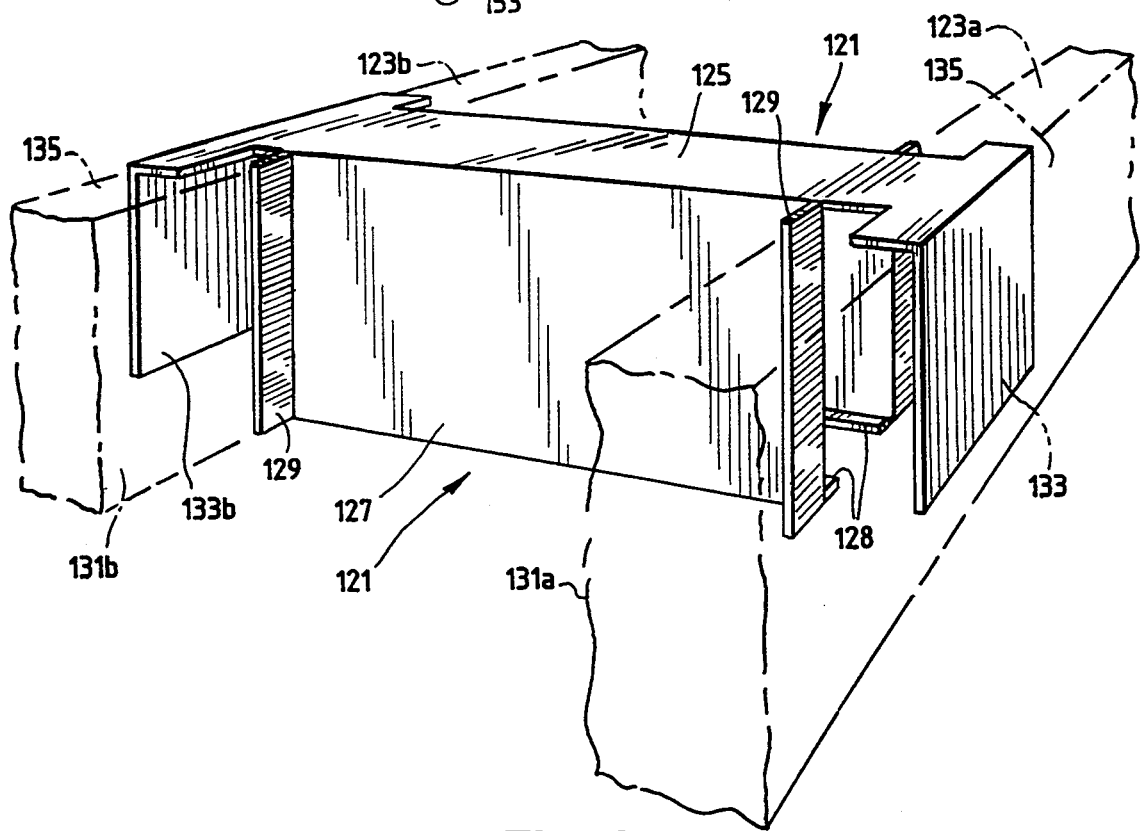
FIG. 9 is a perspective view of the article of FIG. 8 connecting 2 beams.

FIGS. 8 and 9 depict an alternative embodiment of the present invention. A piece of sheet metal 151 has been divided into rectangular areas 125', 127', 128', 129' and 133' corresponding in the three-dimensional article 121 (FIG. 9) to an outside spanning member 125, cross-web members 127, inside spanning members 128, inside clasping member 129, and outside clasping members 133. Unlike the previous embodiment shown in FIGS. 2-7, this embodiment includes two cross-web members 127 connected to the outside spanning member 125 on opposing sides. As in the previous embodiment, the sheet metal blank 151 of FIG. 8 is bent at substantially 90 degree angles as shown by the directional arrows 100 along lines 153 to form the three-dimensional article 121 shown in FIG. 9. The inside clasping members 129 abut the inner surfaces 131 of the beams 123; the outside clasping members 133 abut the outer surfaces 135 of the beams 123. Beam flexion is thus resisted when the article 121 is in position.

Figure 10:
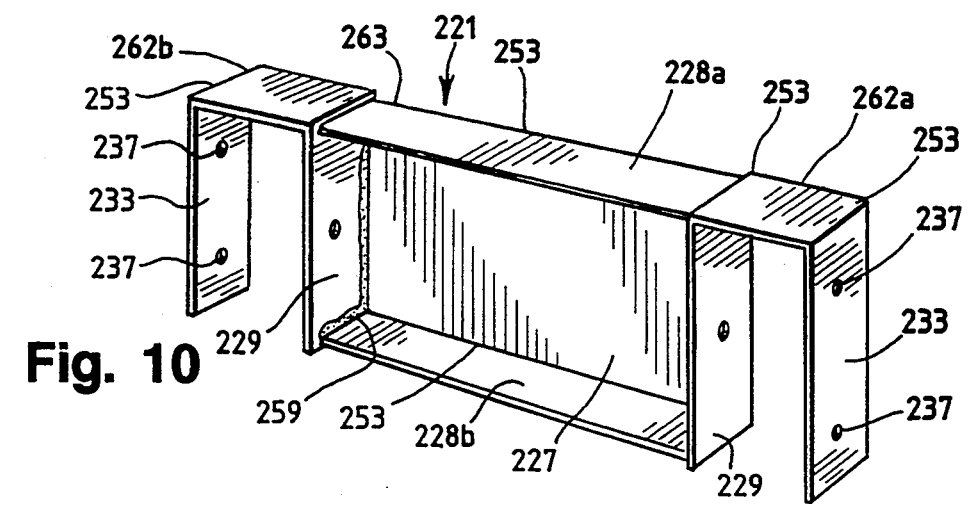
FIG. 10 is a perspective view of a third embodiment of the present invention.
Figure 11:
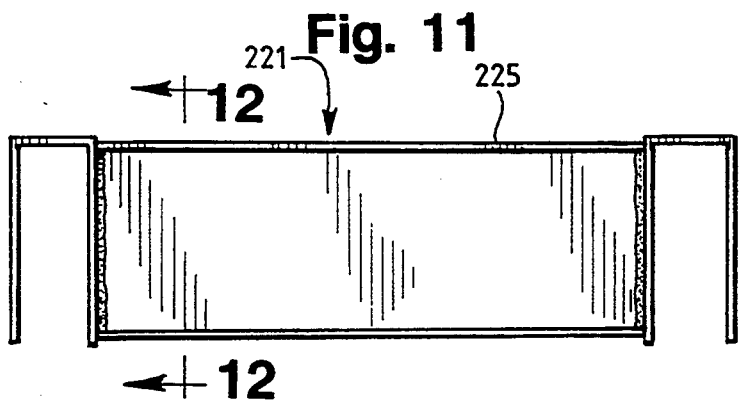
FIG. 11 is a front view of the embodiment of FIG. 10.
Figure 12:
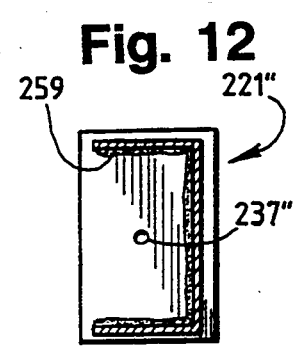
FIG. 12 is a side view of the embodiment of FIG. 10.

Another alternative embodiment 221 is shown in FIGS. 10-12. In this embodiment, three separate pieces of sheeting material 262a, 262b and 263 are provided. Pieces 262a, 262b, and 263 have been bent along lines 253 at substantially 90 degree angles to form U-shapes, which are then fastened together at locations 259 (best seen in FIG. 12) by conventional methods such as welding, thereby forming the article 221. As in the other embodiments, the article 221 includes at least one cross-web member 227, inside clasping members 229, outside clasping members 233, and holes 237 adapted to receive fasteners. Unlike the other embodiments, however, the article 221 includes 2 inner spanning members 228a and b. The function of the outer spanning member is performed in this embodiment by the assembly of the inner spanning member 228a and the upper portions of pieces 262a and b.

Any of the previously described embodiments can be used to connect spaced beams, such as the rafters illustrated in FIG. 2 of a gable overhang for a roof. Although the article and method of the present invention have been described with particularity in reference to such rafters, the article and method can also be used to connect other spaced beams in many other structures. Furthermore, while the present invention has been described with reference to preferred embodiments thereof, illustrated in the accompanying drawings, various changes and modifications can be made by those skilled in the art without departing from the spirit and the scope of the present invention.

What is claimed is:

1. An article suitable for connecting laterally spaced beams, each of such beams having respective inner and outer surfaces, the article comprising:

(a) spanning means adapted to extend between the beams;

(b) a cross-web member having opposite ends and side edges extending between the opposite ends, the cross-web member connected to the spanning means along one of the side edges of the cross-web member, the ends adapted to abut the respective inner surfaces of the beams;

(c) inside clasping means located at each of the ends of the cross-web member and adapted to engage the inner surfaces of the beams, thereby resisting flexion of the beams in an inward direction; and (d) outside clasping means adapted to engage the outer surfaces of the beams, thereby resisting flexion of the beams in an outward direction.

2. The article of claim 1, wherein the spanning means, the cross-web member, the inside clasping means, and the outside clasping means are formed from a single sheet of metal.

3. The article of claim 1, wherein the spanning means further includes an upper surface adapted to be nearly coplanar with the beams.

4. The article of claim 1, including means for fastening the article to the beams.

5. The article of claim 1, further including at least one inside spanning member connected to the cross-web member.

6. An article suitable for connecting laterally spaced beams, each of such beams having respective inner and outer surfaces, the article comprising:

(a) an outside spanning member adapted to extend between the beams, the outside spanning member having opposite ends, each of the ends adapted to overlie a corresponding one of the laterally spaced beams;

(b) a cross-web member having opposite ends and side edges extending between the opposite ends, the cross-web member connected to the outside spanning member along one of the side edges of the cross-web member, the ends adapted to abut the respective inner surfaces of the beams;

(c) an inside clasping member located at each of the ends of the cross-web member, the inside clasping member adapted to engage the inner surface of the beam, thereby resisting flexion of the beams in an inward direction; and (d) an outside clasping member connected to each of the ends of the outside spanning member and adapted to engage the outer surface of the beam, thereby resisting flexion of the beams in an outward direction.

7. The article of claim 6, wherein the inside clasping members are laterally spaced from corresponding outside clasping members to define channels for receiving the beams.

8. The article of claim 7, further comprising holes formed in the article adapted to receive fastening means.

9. The article of claim 6, wherein the inside clasping member has a length, and wherein the opposite ends of the cross-web member have edges extending along the length of the inside clasping member.

10. A gable overhang for a roof, comprising (a) a stable rafter having inner and outer surfaces;

(b) a fly rafter having inner and outer surfaces and spaced from the stable rafter;

(c) an article connecting the stable rafter and the fly rafter having:

i) spanning means extending between the rafters;

ii) a cross-web member having opposite ends and side edges extending between the opposite ends, the cross-web member connected to the spanning means along one of the side edges of the cross-web member, the ends adapted to abut the respective inner surfaces of the beams;

iii) inside clasping members adjacent to the cross-web member and having portions adapted to engage the inner surfaces of the rafters, thereby resisting flexion of the rafters in an inward direction;

iv) outside clasping members connected to the spanning means and having portions adapted to engage the outer surfaces of the rafters, thereby resisting flexion of the rafters in an outward direction; and (d) means for covering the article, the stable rafter and the fly rafter to form the gable overhang.

11. The gable overhang of claim 10, wherein the rafters have upper surfaces nearly coplanar with the spanning means.

* * * * *